UNITED STATES PATENT OFFICE.

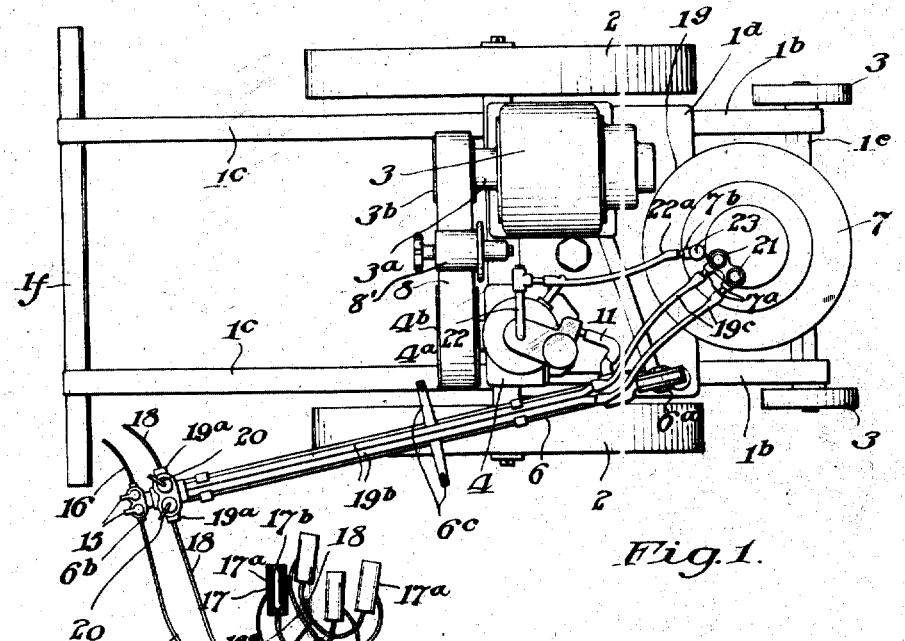

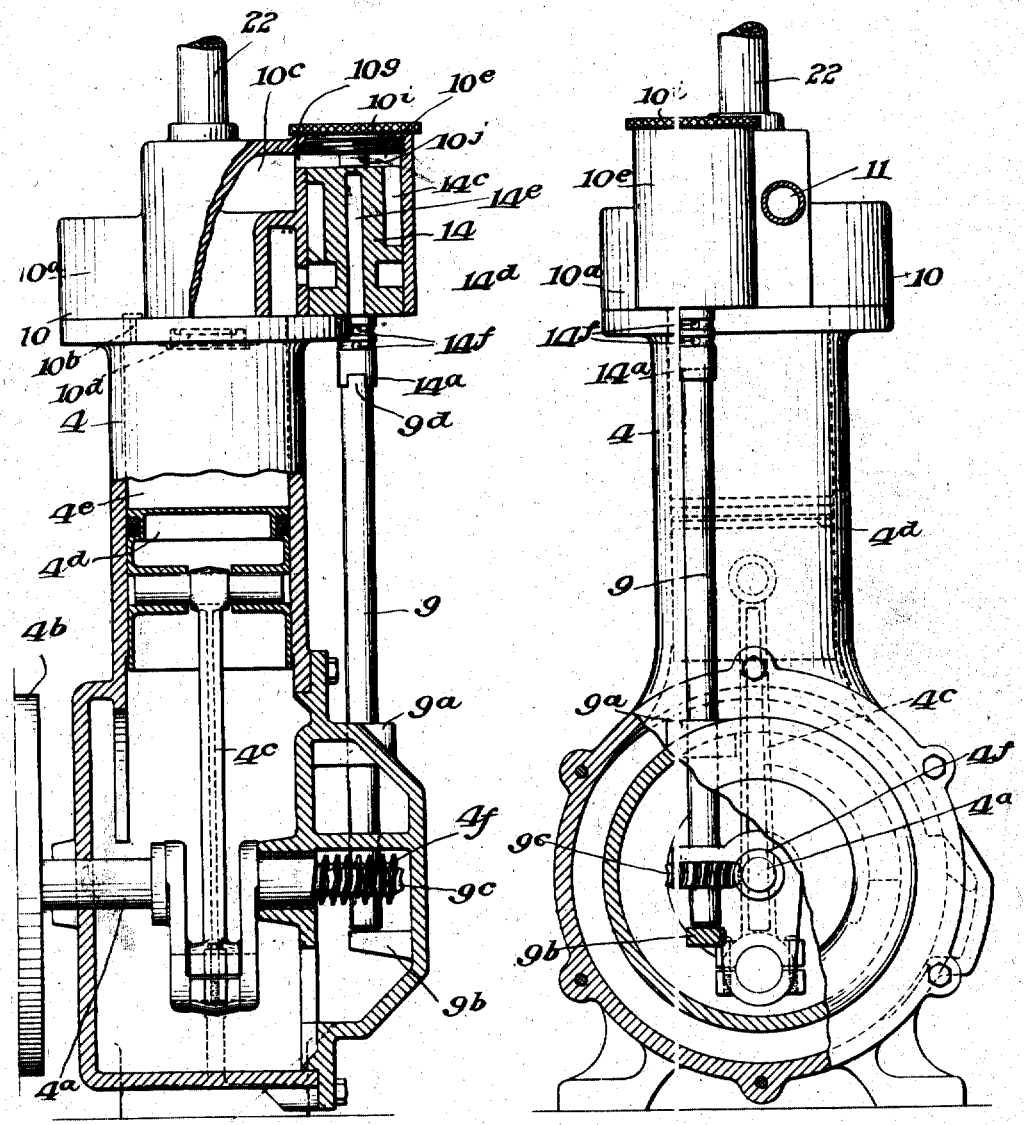

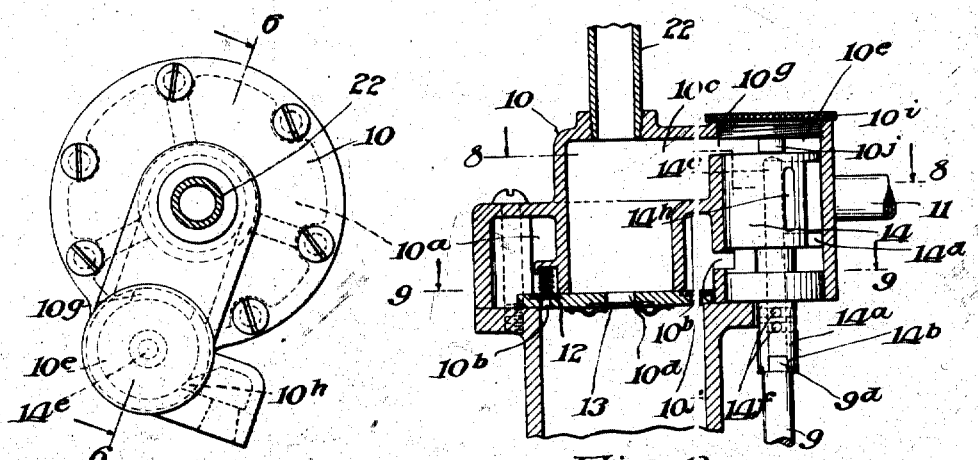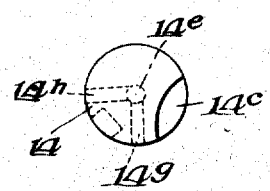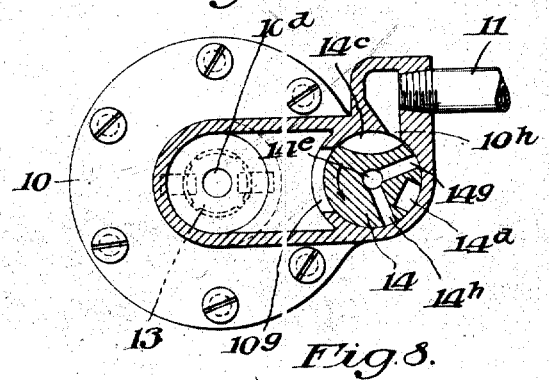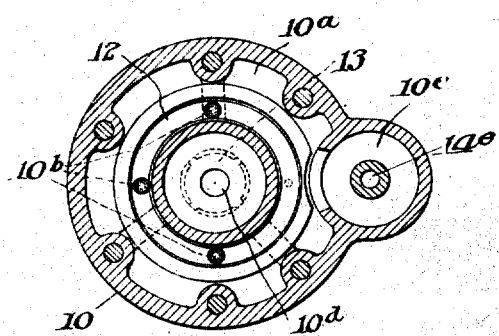

DAVID TOWNSEND SHARPLES AND LAWRENCE P. SHARPLES, OF WEST CHESTER, PENNSYLVANIA.

MILKING-MACHINE.

1,221,483.   Specification of Letters Patent.   Patented Apr. 3, 1917.

Application filed July 27, 1915. Serial No. 42,153.

*To all whom it may concern:*

Be it known that we, DAVID T. SHARPLES and LAWRENCE P. SHARPLES, citizens of the United States, residing at West Chester, in the county of Chester and State of Pennsylvania, have invented certain Improvements in Milking-Machines, of which the following is a specification.

This invention has, as a primary object, the provision of a portable milking machine, preferably comprising a motor, pump, milk reservoir and connections, of simple, improved and efficient character, the specified parts being mounted on a carrier or truck in the preferred form of the construction.

Practical milking machines, heretofore placed upon the market, have been open to the objection that they are too costly for dairymen of small means and small herds, particularly because of the necessity for installing an extended system of fixed parts, the lack of flexibility and inability to make changes readily. The present invention is designed to obviate these defects, being of such character that it is comparatively inexpensive, requires no installation and can be moved in its entirety from place to place very readily.

The characteristic features of the invention are fully disclosed in the following description and the accompanying drawings in illustration thereof.

In the drawings, Figure 1 is a top plan view of a milking machine embodying the invention; Fig. 2 is a side elevation of the same; Fig. 3 is an enlarged part sectional elevation of the pump detached from its connections shown in Figs. 1 and 2; Fig. 4 is a part sectional elevation of the detached pump viewed at right angles to its position shown in Fig. 3; Fig. 5 is a top plan view of the pump; Fig. 6 is a vertical sectional view taken on the line 6—6 of Fig. 5; Fig. 7 is a top plan view of the detached pulsator valve shown in operative relation in Fig. 6; Fig. 8 is a sectional view taken on the line 8—8 of Fig. 6; and Fig. 9 is a sectional view taken on the line 9—9 of Fig. 6.

The invention, as illustrated in the drawings, comprises a truck having a frame 1 carried by wheels 2 and 3; the frame having side bars comprising substantially horizontal intermediate sections $1^a$ and oppositely extending inclined sections $1^b$ and $1^c$, in combination with a floor $1^d$ supported by the sections $1^a$, a sill $1^e$ connecting the lower ends of the sections $1^b$ and a cross piece $1^f$ connecting the upper ends of sections $1^c$ and providing a handle.

The frame 1 carries a gas or electric motor 3, a pump 4, a standard 5 with its oscillatory arm 6 and a milk can 7, with their connections hereinafter described; the motor, pump and standard being mounted on the floor $1^d$ between the high wheels 2 and the can standing on the sill $1^e$ between the low wheels 3, below the floor, which is provided with the recess $1^g$ to receive the body of the can.

The motor 3 is provided with a shaft $3^a$ having a pulley $3^b$ thereon and the pump 4 is provided with a shaft $4^a$ with a pulley $4^b$ thereon, the pulleys being connected by a belt 8 held to proper tension by the tightener 8', through which the motor operates the pump.

The crank shaft $4^a$, which acts through the connecting rod or pitman $4^c$ to reciprocate the piston $4^d$ in the cylinder $4^e$, is provided with a worm $4^f$; and a shaft 9, which is journaled in a bearing $9^a$ and carried by a step bearing $9^b$, is provided with a worm or helical gear $9^c$ which engages the worm $4^f$, whereby the crank shaft $4^a$ operates the piston $4^d$ and shaft 9 in unison.

The pump cylinder $4^e$ is provided with a head 10 containing a pressure chamber $10^a$ to which air is delivered through the ports $10^b$ from the cylinder, a vacuum chamber $10^c$ which is exhausted through the port $10^d$ into the cylinder, and a valve chamber $10^e$ having the ports or passages $10^f$ and $10^g$ communicating with the respective chambers $10^a$ and $10^c$ and the port $10^h$ communicating with the conduit 11.

A check valve 12, in the form of a ring surrounding the chamber $10^c$, controls the ports $10^b$, and a check valve 13 controls the port $10^d$.

A cylindrical valve 14 is journaled in the chamber $10^e$ and is provided with a stem $14^a$ containing a socket $14^b$ which makes a positive engagement with the flattened end $9^d$ of the shaft 9, the valve being engaged or detached by moving it longitudinally in its chamber when the latter's cap $10^i$ is removed, and being normally held in operative position by the stud $10^j$ on the cap seated in the end of the chamber.

The valve 14 is provided with the peripheral port or passage 14ᶜ, which is in constant communication with the vacuum chamber 10ᶜ through the port or passage 10ᵍ and is adapted to communicate with the port 10ʰ; with the peripheral passage 14ᵈ, which is in constant communication with the pressure chamber 10ᵃ through the port 10ᶠ and is adapted to communicate with the port 10ʰ; and with the longitudinal passage 14ᵉ, which is in constant communication with the atmosphere through the ports 14ᶠ and is adapted to communicate through its branch passages or ports 14ᵍ and 14ʰ with the port 10ʰ.

The conduit 11 communicates with the bored arm or conduit 6, having the hinge or flexible connection 6ᵃ with the journaled cap 5ᵃ of the standard 5, this arm having the branches 6ᵇ which are controlled by the stop cocks 15. Flexible tubes 16 connect the branches 6ᵇ with the branch tubes 16ᵃ, which latter communicate with the teat cup chambers 17 formed by the shells 17ᵃ and the flexible linings 17ᵇ, the arm 6 being provided with the hooks 6ᶜ on which the teat cups can be hung.

Flexible tubes 18 are connected with the teat cups, in communication with the interiors of the respective linings 17ᵇ, and with the branches 19ᵃ of a fixture 19 which is carried on the arm 6. The branches 19ᵃ communicate through the fixture, under control of the stop cocks 20, with the conduits 19ᵇ, which are carried on the arm 6 and have the flexible couplings 19ᶜ for connecting them flexibly and detachably with the nipples 7ᵃ of the hermetically sealed can 7, the communication through the nipples being controllable by the valves 21.

A conduit 22 connects the vacuum chamber 10ᶜ with the nipple 7ᵇ of the can 7, the conduit having the flexible section 22ᵃ for detachably and flexibly connecting it with the nipple and a valve 23 controlling the passage through the latter.

When the motor 3 operates the pump 4, the piston 4ᶜ, on its up stroke, forces air through the ports 10ᵇ into the chamber 10ᵃ (where it is trapped by the valve 12); and, on its down stroke, the piston exhausts air from the chamber 10ᶜ through the port 10ᵈ, the valve 13 closing automatically to hold the vacuum. The chamber 10ᶜ being connected by the conduit 22 with the hermetically sealed can 7, the latter is exhausted and, when in communication (through conduits 18, 19 and 19ᵃ) with the interior of a cup lining 17ᵇ and a teat therein, milk is drawn through the conduits into the can, the suction through the conduits being continuous.

The revolution of the valve 14 connects the port 10ʰ sequentially with the vacuum chamber 10ᶜ, through the passages 14ᵇ and 14ᶜ; with the atmosphere, through the passages 14ᵃ, 14ᵉ and 14ᶠ; with the pressure chamber 10ᵃ, through the passages 14ᵈ and 10ᶠ; and with the atmosphere, through the passages 14ʰ, 14ᵉ and 14ᶠ. Hence the exterior of the teat cup lining 17ᵇ, through the connection of the port 10ʰ by the conduit 11 with the chamber 17, is subject to the pulsating effect due to vacuum, atmospheric pressure, superior pressure and atmospheric pressure applied in sequence by the action of the rotary valve or pulsator.

As the milking machine, in its entirety, is readily transported as a unit, and as the milking arm is movable about both a horizontal and a vertical axis so that it can be turned out of the way when not in use and to any desired position for the application of the teat cups to use, such machine is readily placed at any desired position, convenient for milking, the machine being adapted for milking cows in pairs.

Having described our invention, we claim:

1. A milking machine comprising a milk receptacle, a teat device connected with said receptacle, a pump, and mechanism connecting said pump with said receptacle and device whereby milk can be drawn from said device into said receptacle, said mechanism comprising a vacuum chamber exhausted by the action of said pump, a pressure chamber into which fluid is forced by said pump, a valve for controlling communication between said chambers and said device, and means whereby said pump and valve are operated in synchronous relation.

2. A milking machine comprising a milk receptacle, a teat device connected with said receptacle, a pump, and mechanism connecting said pump with said receptacle and device, said mechanism comprising a vacuum passage, a pressure passage, a valve adapted for connecting said device with said vacuum passage, said pressure passage and the atmosphere periodically.

3. A milking machine comprising a receptacle, a teat device connected therewith, a pump having a piston, a valve and means whereby said valve is operated in synchronous relation to said piston and said teat device is subjected to suction and pressure.

4. A milking machine comprising a teat cup having a chamber provided with a pulsatory wall, a pump, and means comprising a valve whereby said pump applies suction, atmospheric pressure and superior pressure periodically to said chamber.

5. A milking machine comprising a teat cup, a pump, a valved pressure chamber charged by said pump, a valved vacuum chamber exhausted by said pump, and means comprising a rotary valve whereby said teat cup is connected periodically with said chambers.

6. A milking machine comprising a teat cup, a pump, a valved pressure chamber charged by said pump, a valved vacuum chamber exhausted by said pump, and means comprising valve mechanism operated by said pump whereby said teat cup is connected periodically with said pressure chamber, vacuum chamber and the atmosphere.

7. A milking machine comprising a teat cup, a milk receptacle connected therewith, a pump having a rotary member, a valved pressure chamber charged by said pump, a valved vacuum chamber exhausted by said pump, and means whereby said chambers are connected periodically with said teat cup and said teat cup is exhausted into said receptacle, said means comprising a rotary valve and means whereby said rotary member rotates said valve.

8. A milking machine comprising a teat cup, a milk receptacle connected therewith, a pump having a crank shaft and a piston connected therewith, a valved pressure chamber charged by said pump, a valved vacuum chamber exhausted by said pump, and means whereby said teat cup is connected with said chambers and the atmosphere periodically, said means comprising a rotary valve, a journaled shaft for rotating said valve, and means whereby said crank shaft rotates said shaft second named.

9. A milking machine comprising a milk receptacle, a teat cup, and mechanism comprising an arm movable relatively to said receptacle for carrying said teat cup and exhausting the same into said receptacle.

10. A milking machine comprising a carrier, an oscillatory arm supported by said carrier and provided with one or more conduits, a teat cup connected with said conduits, and means for applying pressure and suction to said teat cup through said conduits.

11. A milking machine comprising an oscillatory arm provided with one or more conduits, a teat cup, one or more flexible tubes connecting said teat cup with said conduit or conduits, and fluid pressure mechanism connected with said conduit or conduits.

12. A milking machine comprising a traveling carrier, an arm supported adjustably by said carrier and provided with one or more conduits, a teat cup, a flexible tube or tubes connecting said teat cup with said conduit or conduits, a milk receptacle supported by said carrier and connected with a conduit aforesaid, and fluid pressure mechanism supported by said carrier and connected with said conduit or conduits, whereby milking is effected and milk drawn into said receptacle.

13. A milking machine comprising a traveling carrier, a universally movable arm supported by said carrier and provided with conduits, a teat cup having separated spaces connected with the respective conduits, a receptacle supported by said carrier and connected with one of said conduits, and a pump supported by said carrier and connected with said receptacle and the other of said conduits.

In testimony whereof, we have hereunto set our names.

DAVID TOWNSEND SHARPLES.
L. P. SHARPLES.